No. 728,822. Patented May 19, 1903.

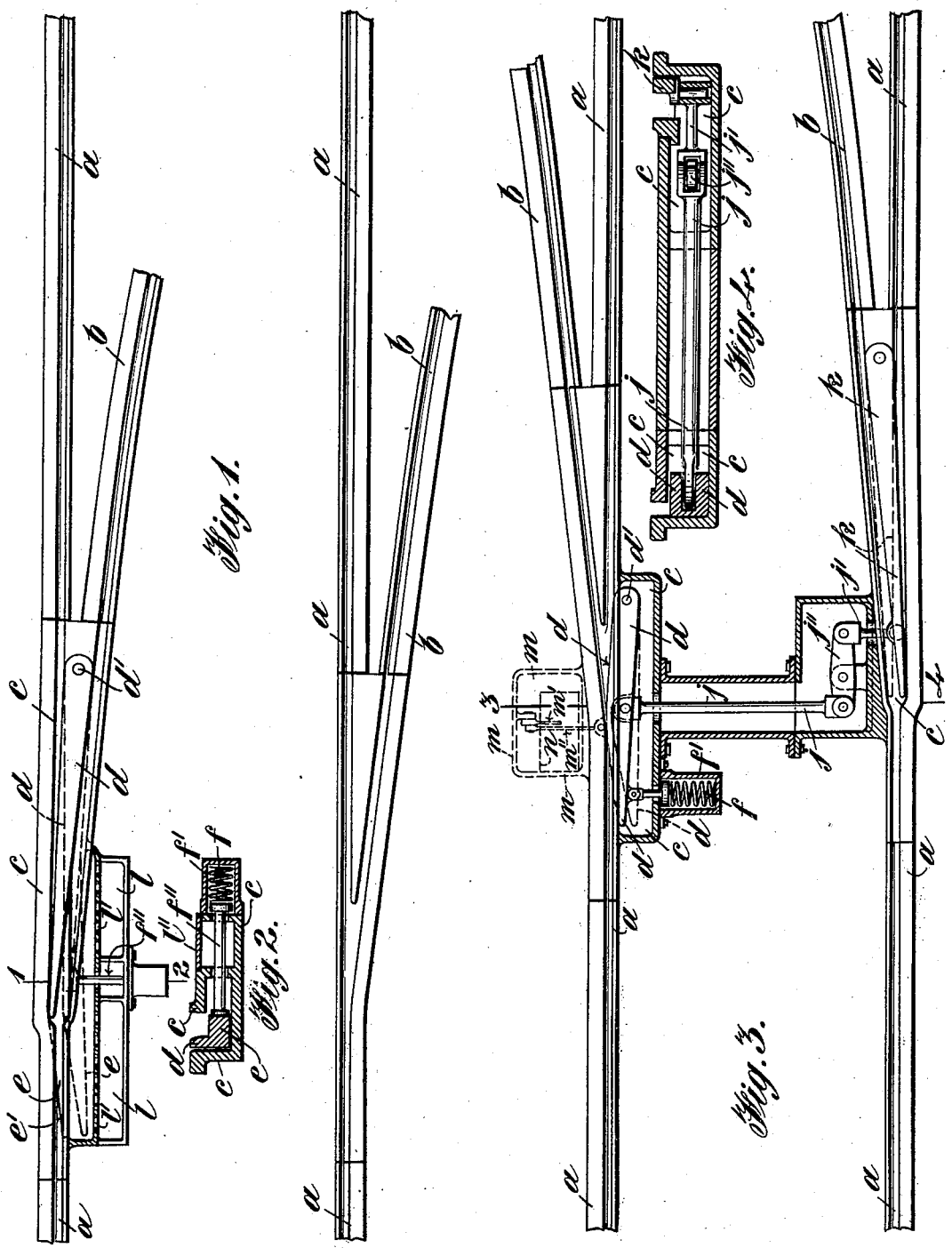

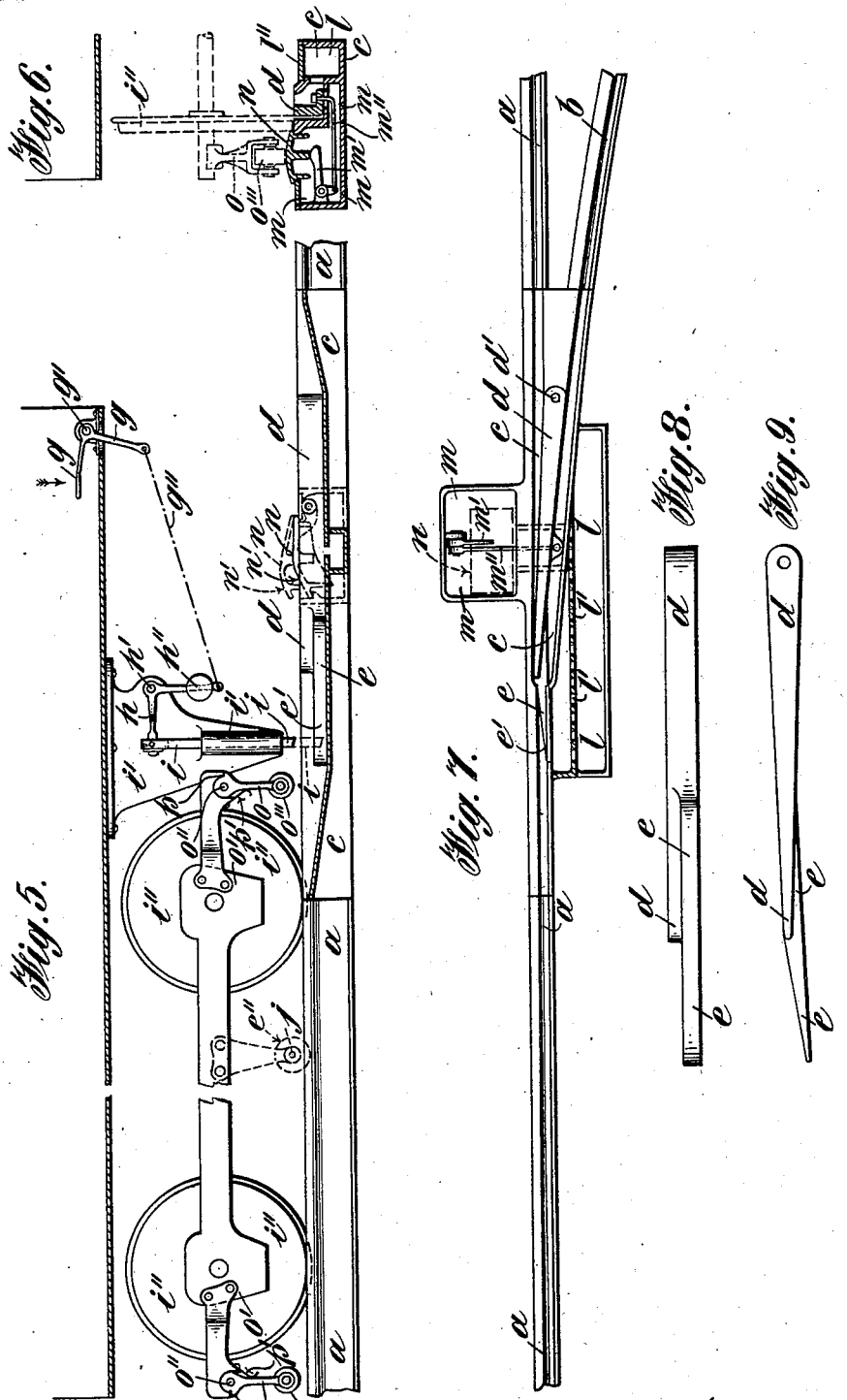

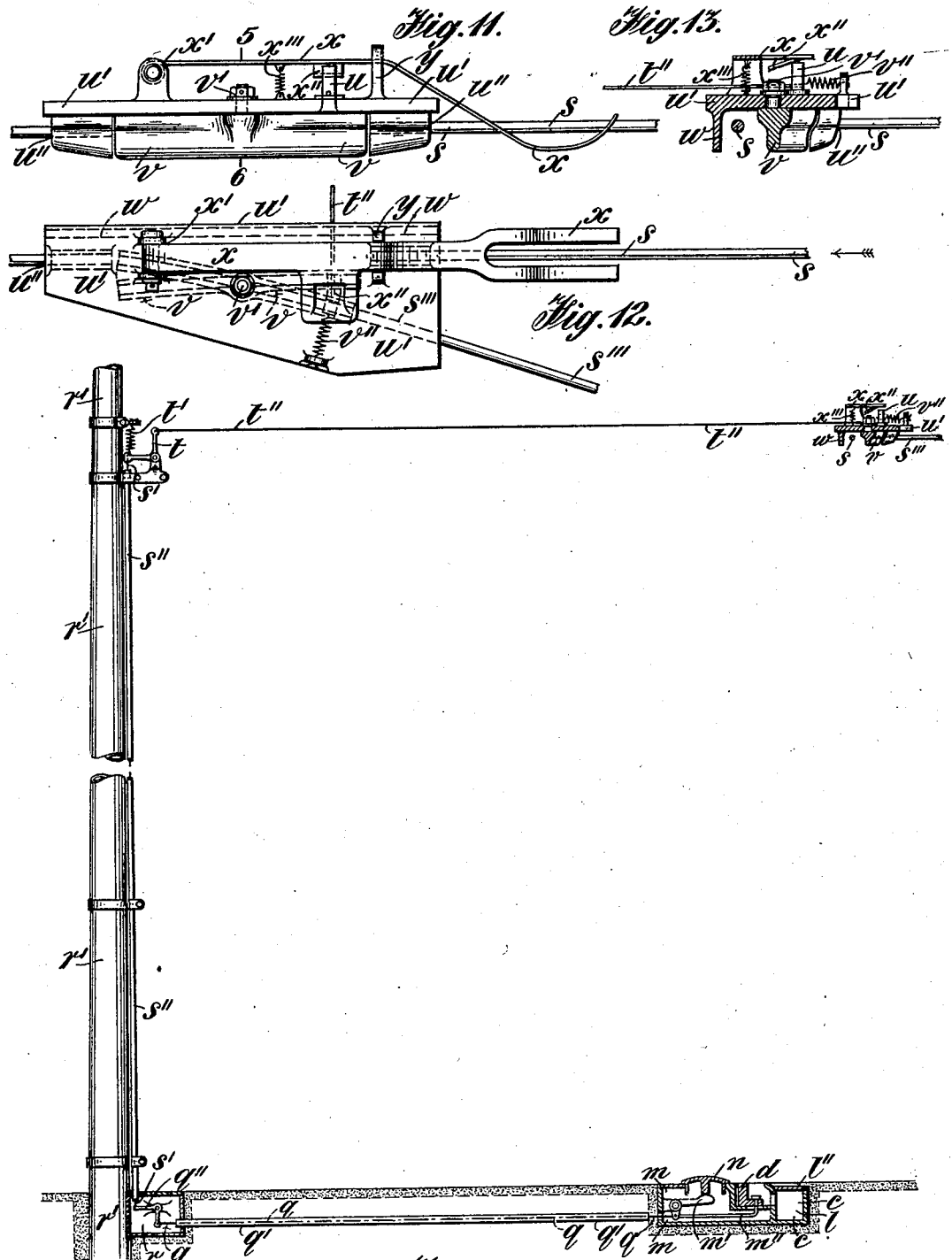

UNITED STATES PATENT OFFICE.

STANISLAS ZYLBERLAST, OF MANCHESTER, ENGLAND.

MEANS FOR OPERATING THE POINTS ON TRAMWAY OR LIKE TRACKS.

SPECIFICATION forming part of Letters Patent No. 728,822, dated May 19, 1903.

Application filed November 3, 1902. Serial No. 129,924. (No model.)

*To all whom it may concern:*

Be it known that I, STANISLAS ZYLBERLAST, engineer, a subject of the Emperor of Russia, residing at 517 Stretford road, Manchester, in the county of Lancaster, England, have invented certain new and useful Improvements in Means for Operating the Points on Tramway or Like Tracks, of which the following is a specification.

This invention relates to improvements in means for operating the points on tramway and like tracks, and while specially designed for operating the rail-points and the points in connection with overhead electrical equipment on electric tramways part of the improvements are also applicable for operating the points on tracks where horse, steam, or other haulage power as distinct from electric power is employed.

The object of the present invention is to provide a device chiefly of a semi-automatic character—that is to say, one in which the points of the rail-track may be operated, as desired, by a simple act of the driver of the vehicle, and yet be returned to position when the vehicle has passed automatically. These remarks apply generally, whatever the form of haulage power is used, and are also applicable to the overhead electrical equipment in which a trolley-arm or like device is used for collecting the electric current and conducting it to the motors for propelling the vehicle.

My invention will be fully described with reference to the accompanying drawings, in which—

Figure 1 is a plan of a tramway-track with my improvements applied thereto; Fig. 2, a cross-section of part of the track on line 1 2; Fig. 3, a plan of the tramway-track, showing the means adopted for operating the points to lead a vehicle the opposite way to that in connection with Fig. 1; Fig. 4, a cross-section of the track on line 3 4; Fig. 5, a side elevation of so much of a vehicle and tramway-track as is necessary to show the means for operating the points both by the aid of the driver and for returning them to their normal position automatically; Fig. 6, a partial sectional elevation of the tramway-track and operating means; Fig. 7, a partial plan of the track and operating means; and Figs. 8 and 9, side elevation and plan, respectively, showing the details of an improvement in the rail-points. Fig. 10 is an elevation, partly in section, of a portion of a tramway-track, illustrating the means for operating the points in connection with the overhead electrical equipment, while Figs. 11, 12, and 13 are respectively side elevation, plan, and cross-section on line 5 6, showing the arrangement of the overhead point.

In all the drawings like letters refer to similar parts; but, referring principally for the present to Figs. 1 and 2, $a$ indicates the straight lines of a tramway-track, and $b$ the curved lines, while $c$ shows the point-boxes, which as to their general character may be constructed on ordinary lines. $d$ is the point pivoted at $d'$ to the point-box and normally resting in the position shown in full lines in Fig. 1. An important feature of my invention in connection with the point $d$ is that I provide it at its free end with an extending nose $e$, which is inclined so as to pass across the groove in the rail or point-box in the manner indicated at $e'$ when the point is in the full-line position for enabling the vehicle to pass along the lines $b$ of the track. The portion $e$ is, as will be seen in Figs. 8 and 9, principally stepped down, so as to clear the bottom side of the groove in the track. The point is kept in the full-line position indicated so long as vehicles are only required to pass on the lines $b$ by means of a spring $f$, located in a box or chamber $f'$, attached to or forming part of the point-box $c$, the said spring pressing against one end of a rod $f''$, the other end of which is secured to the point $d$. When it is desired that the vehicle should pass along the lines $a$, the point $d$ is shifted toward the right by the means indicated in Fig. 5. In this view $g$ is a bell-crank lever pivoted at $g'$ and communicating, by means of a chain $g''$, rod, or the like, with another similar lever $h$, pivoted at $h'$ and provided on one arm with a weight $h''$ or spring, while the other arm is connected to a slidable operating-rod $i$, mounted in the bracket $i'$, attached to the frame of the vehicle. On the driver depressing the lever $g$ the rod $i$ is pushed downward from the full-line to the broken-line position indicated in Fig. 5, when it comes into contact with the inclined end $e$ of the point $d$ and pushes the latter to the right prior to the wheels $i''$ of the vehicle reaching the point. As soon as the flange of the wheel comes in contact with the point it retains the latter in the broken-line position until the vehicle has passed, when the spring $f$ pushes the point back to the normal position. Where the points are less in length than the wheel-base of the vehicle, I introduce on the frame of the vehicle studs $j$, carried in suitable brackets, on which are mounted small disks or flanged wheels $e''$, each capable of engaging with a point $d$ to hold it in the broken-line position until the last wheel of the vehicle comes opposite the point. In the mechanism operated by the driver it is only necessary for him to depress the rod $i$ just prior to reaching the point and until the wheel comes behind the latter, when he may release the lever $g$ and allow the weight $h''$ or spring on lever $h$ to return the rod to the full-line position.

Referring now to Figs. 3 and 4, which show the means adopted for operating a point to enable the vehicle to pass on the straight portion of the track instead of to the left, I use a special point $d$, constructed in a very similar way to the point $d$ referred to in Fig. 1, but preferably somewhat shorter, and this I connect by means of links $j j'$ and pivoted lever $j''$ with an ordinary point $k$ at the other side of the track. The combined points are operated in a similar way to that already described in connection with Fig. 5, this arrangement of points being adopted to dispense with the use of more than one rod $i$ at each end of a vehicle, though, as will be readily understood, the point could be arranged exactly as in Fig. 1, except at the other side of the track if two such rods $i$ were used, one to correspond with each rail of the track. The whole of the parts referred to which are beneath the surface of the track in Figs. 1 to 4 are inclosed in suitable boxes, tubes, or casings to enable them to operate properly, and in addition to these boxes or casings I may employ an additional box $l$ or chamber formed in one with or attached to the point-box $c$ to receive any dust, mud, or other material which may accumulate in the groove of the tramway-rail near to the points, so that as the latter are moved over the material falls into the box and may be removed therefrom from time to time, as desired. To admit the material into the box $l$, holes or slots $l'$ are formed in the side of the box and communicate with the groove in the track. The box is provided with a lid $l''$ to enable the mud or other material to be removed from time to time.

Instead of using a spring, such as $f$, to return the point $d$ to its normal position after the passage of a vehicle I may use automatic means for the same purpose. These consist of a compartment or box $m$, attached to or forming part of the point-box $c$ and having pivoted within it a bell-crank lever $m'$, the short arm of which is connected by a rod or link $m''$ to the point $d$, as indicated in Figs. 5 to 7. The box $m$ is provided with a pivoted lid or cover $n$, which is normally slightly above the level of the pavement or tramway-track, but not so as to obstruct the passage of ordinary vehicles across the latter. The lid $n$ normally rests upon or is coupled to the lever $m'$, and when the point $d$ is pushed over by means of the slidable rod $i$, as previously described, the lid $n$, through the agency of the link $m''$ and lever $m'$, is raised to the broken-line position indicated in Fig. 5, in which position it presents an inclined face $n'$ to an operating device carried by the truck of the tramway-car. This device may consist of a depending rod; but I prefer to employ an arm or lever $o$ at each end of the truck $o'$ and pivoted at $o''$. The lower ends of these levers are provided with bowls $o'''$, designed to come in contact with the lid $n$, so as to depress it and return the point $d$ to its normal position when the last wheel of the vehicle has passed the point. The first of the levers $o$ in the direction in which the vehicle is proceeding is arranged to rise backward without operating the lid $n$, while the last lever $o$ becomes rigid by reason of being provided with a stop $p$, and this lever therefore depresses the lid $n$ and returns the point $d$ to its normal position, as previously described. To prevent the levers $o$ swaying when not operating the points, I arrange a spring $p'$ of a light character to just hold them in the position indicated in the drawings.

As it is necessary in the overhead system of electrical traction to move the cable-points simultaneously with or about the same time as the facing-points of the tramway-track, I have indicated in Figs. 10 to 13 the means whereby this can be accomplished. These means are used in conjunction with the slidable rod $i$, lid $n$, and its connections, as is clearly indicated in Fig. 10. In this view like letters indicate similar parts to those referred to in the figures of drawings already described. Referring to Figs. 10 to 13, it will be seen that I couple to the bell-crank lever $m'$ or to the point $d$ a light wire or rod $q$, inclosed in a tube $q'$, the other end of which is connected to a small bell-crank lever $q''$, arranged in a box $r$, close to one of the masts or pillars $r'$, supporting the overhead equipment, including the electrical cable $s$. The lever $q''$ has attached to it another rod or wire $s'$, preferably inclosed in a tube $s''$, supported by the mast and connected at its top end with another bell-crank lever $t$, the inner arm of which is coupled to a spring $t'$, while the outer arm is connected by a wire $t''$ to a stud or arm $u$, projecting through a slot in a plate or bracket $u'$, to which the ends of the cable are secured at $u''$, as indicated in Figs. 11 to 13. The stud $u$ forms part of or is attached to the cable-point $v$, which is pivoted at $v'$ to the bracket $u'$. The cable-point normally lies in a position following the curve of the branch cable $s'''$, as indicated in Fig. 12, and should the vehicle be required to pass along the line of this cable none of the parts are operated; but if the vehicle is required to pass in the direction of the cable $s$ from left to right then the driver depresses the slidable rod $i$, as before described, and the bell-crank lever $m'$ through the connections just described pulls the cable-point $v$ into a position parallel with the cable $s$, as indicated in Fig. 12. In this position the cable-point forms, with a flange $w$, projecting beneath the bracket $u'$, a conduit to allow the grooved pulley carried by the trolley-arm to pass freely between them, the electrical connection being kept up by the bracket, as will be readily understood. The cable-point is normally held in line with the branch cable $s'''$ by means of a light spring $v''$, but when moved into the position parallel with the main cable $s$ the stud $u$ lifts up a plate or lever $x$, pivoted at $x'$, and comes behind a catch $x''$, the lever $x$ being pulled downward by a light spring $x'''$, so as to retain the parts in the parallel position before described. The lever $x$ is, as will be seen, guided in its movement by a slotted bracket $y$, while its free end is forked to pass below and embrace the cable $s$, as seen clearly in Fig. 11. The parts are returned to their normal position so soon as the trolley-arm has passed the cable-point $v$ by the pulley on it coming into contact with the forked end of lever $x$ and lifting it so as to disengage catch $x''$ from the stud $u$ and allow the cable-point to be drawn back by the spring $v''$. The spring $x'''$ pulls the lever $x$ to the normal position when the trolley-pulley has passed. The spring $t'$ also assists in bringing the parts to their normal positions. In case of a car requiring to pass from right to left in the direction of the arrow the pulley on the trolley-arm turns the cable-point about its pivot as it passes between the flange $w$ and the point, though in this case the latter is not pushed sufficiently far to engage with the catch $x''$. Consequently so soon as the trolley-pulley has passed the spring $v''$ returns the point to its normal position in line with the branch cable $s'''$.

In conclusion, I would have it understood that the details of the invention may be departed from without affecting its spirit and that both the track-points and cable-points may be arranged to allow the vehicle to pass in any direction desired.

What I claim as my invention, and desire to protect by Letters Patent, is—

1. A point-shifting device for tramway and like tracks comprising a pivoted point provided with an extending nose adapted to lie at an angle across the track when the point is in its normal position in combination with an ordinary facing-point, both said points being connected by a lever-and-link arrangement and controlled as to their return movement to normal position by a spring device substantially as described.

2. A point-shifting device for tramway and like tracks comprising a pivoted point provided with an extending nose adapted to lie at an angle across the track when the point is in its normal position, a link or rod connected by one end to said point and by the other to a bell-crank lever, a box embracing said lever provided with a pivoted lid normally resting on or connected to the bell-crank lever, an operating-rod carried by the vehicle moving on the tramway-track and adapted to engage with the extending nose of the tramway-point to lift the pivoted lid above the level of the tramway-track and a depressing-rod or pivoted lever carried by the vehicle adapted to engage with the pivoted lid to return the parts to their normal position substantially as described.

3. A point-shifting device for tramway and like tracks comprising a pivoted point provided with an extending nose adapted to lie at an angle across the track when the point is in its normal position a link-and-lever device connecting said point with an ordinary pivoted facing-point on the opposite side of the track, a link or rod connected by one end to said point and by the other to a bell-crank lever, a box embracing said lever provided with a pivoted lid normally resting on the bell-crank lever, an operating-rod carried by the vehicle moving on the tramway-track and adapted to engage with the extending nose of the tramway-point to lift the pivoted lid above the level of the tramway-track and a depressing-rod carried by the vehicle adapted to engage with the pivoted lid to return the parts to their normal position substantially as described.

4. In a tramway-point-shifting device the combination with a pivoted point provided with an extending nose adapted to lie at an angle across the track and with an operating-rod device carried by the vehicle moving on the track, of disks mounted in the frame of the vehicle and adapted to engage with the pivoted point as the vehicle passes along substantially as described.

5. A point-shifting device for the cable-lines of overhead tramway and like tracks consisting of a plate or bracket supporting the current-cables, a cable-point pivoted to said bracket normally lying in the line of one of the cables, a link-and-lever arrangement one end of which terminates with a connection at the cable-point while the other end is connected to a bell-crank lever embraced by a street-box having pivoted thereto a lid normally resting on or connected to said lever, a rod connected to the bell-crank lever and to a pivoted point provided with an extending nose adapted to lie at an angle across the rail-track and an operating-rod carried by the vehicle moving on the track and adapted to engage with the extending nose of the pivoted point substantially as described.

6. In a point-shifting device for the cable-points of an overhead tramway equipment the combination with a cable-point pivoted to a plate forming a connection for the cables by which it is supported, of a stud extending from the cable-point adapted to engage with a spring-controlled catch-lever designed to hold the cable-point in a position more or less parallel with the electrical cable when the point has been moved into such position by a lever-and-link device controlled by the facing-point of the tramway-track, the said spring-controlled lever also being adapted to embrace the electrical cable and to be operated by the pulley of a trolley-arm substantially as and for the purposes described.

In witness whereof I have hereunto set my hand in the presence of two witnesses.

STANISLAS ZYLBERLAST.

Witnesses:
WILLIAM H. TAYLOR,
JAS. STEWART BROADFOOT.